(Model.)
M. C. BARDEN.
CREAM SEPARATOR.
No. 345,874. Patented July 20, 1886.
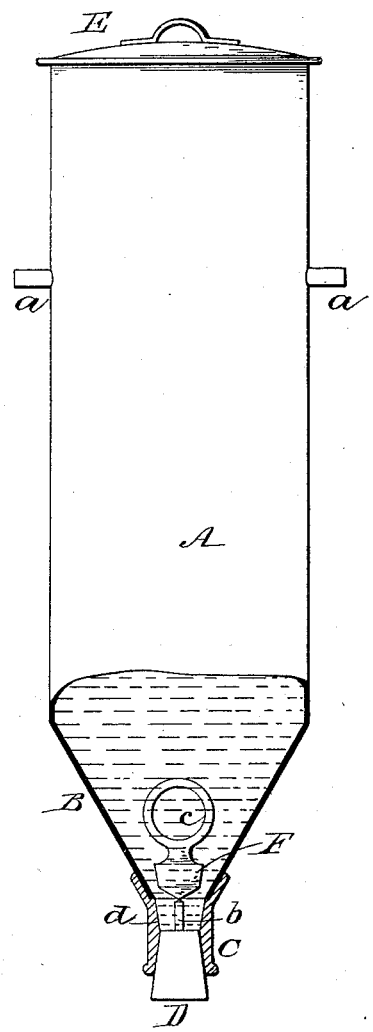
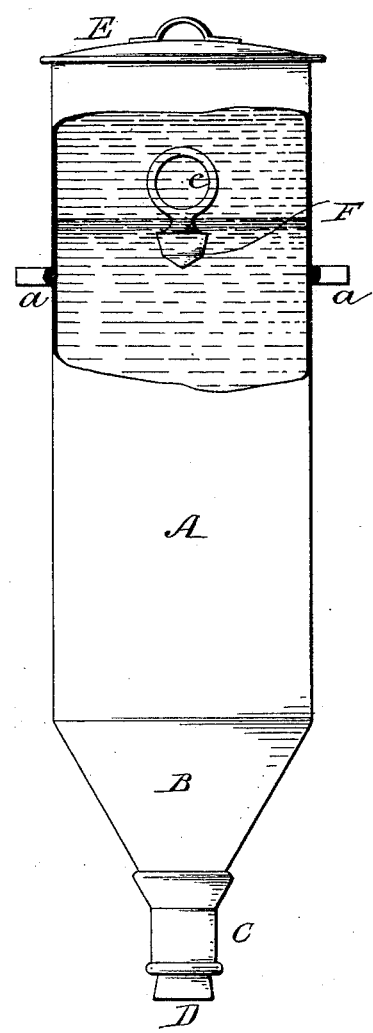
WITNESSES:
INVENTOR:
M. C. Barden
BY Munn & Co.
ATTORNEYS.

UNITED STATES PATENT OFFICE.

MERRITT C. BARDEN, OF WEST PAWLET, VERMONT.

CREAM-SEPARATOR.

SPECIFICATION forming part of Letters Patent No. 345,874, dated July 20, 1886.

Application filed March 25, 1886. Serial No. 196,531. (Model.)

*To all whom it may concern:*

Be it known that I, MERRITT C. BARDEN, of West Pawlet, in the county of Rutland and State of Vermont, have invented a new and useful Improvement in Cream-Separators, of which the following is a specification, reference being had to the annexed drawings, forming a part thereof, in which—

Figure 1 is a side elevation with a part broken away, showing the position of the separating-stopper when the can or receiver is filled with new milk. Fig. 2 is a side elevation, with parts broken away, showing the position of the parts after the cream has been separated from the milk.

Similar letters of reference indicate corresponding parts in both figures of the drawings.

The object of my invention is to provide a device in which the cream will be separated from the milk without the employment of machinery or aid of the eye.

My invention consists in a milk-receiver having a conical bottom terminating in a neck closed with a stopper, and in the combination therewith of a floating stopper having greater specific gravity than new milk charged with cream, but having less specific gravity than milk from which the cream has been separated.

The milk-receiver A is provided with a conical bottom, B, terminating in a tubular neck, C, which is closed by a stopper, D.

The milk-receiver A is provided with trunnions $a$, placed above its center of gravity, by which it is supported in a vertical position.

An ordinary cover, E, is fitted to the open upper end of the milk-receiver A, for excluding air and dust from the milk.

The stopper D is provided with a projection, $b$, which projects upward into the receiver A, and supports the inside stopper, F, when the milk-receiver is filled with new milk.

The stopper F is provided with a hollow ring, $c$, and its specific gravity is greater than that of the new milk contained by the receiver, and less than that of milk deprived of its cream. The lower end of the stopper F is made heavier than the top, to cause it to retain a vertical position in the receiver A, or the stopper may be spherical.

When the receiver A is filled with new milk, the stopper F rests upon the projection $b$, projecting from the stopper D, and after the cream has risen to the top of the receiver, the milk in the lower part of the receiver being heavier than the stopper F, buoys the stopper up and sustains it at the dividing-line between the milk and the cream.

To determine whether the cream has been separated from the milk, the stopper D may at any time be removed, and if the stopper F is in the lower part of the receiver A it will be carried at once to its seat $d$ in the neck C; but if the stopper F is absent from the lower part of the receiver A it indicates that the milk contained by the lower part of the receiver has become heavier by giving up its cream, and has caused the stopper F to rise to the dividing-line of the milk and cream. If, now, the milk is allowed to flow through the neck C, the stopper F will move downward with the milk, maintaining its position relative to the lower stratum of the cream, and will enter its seat $d$ in the neck C when the milk has flowed out and the cream has reached the lower part of the conical bottom of the receiver.

The stopper F may be made of any suitable material; but on account of its superior cleanliness glass is preferred. The stopper may be made of the proper gravity to separate any two liquids of different densities, and the receiver may be made of any suitable material, tin being preferred.

Having thus described my invention, what I claim as new, and desire to secure by Letters Patent, is—

1. The combination, with the milk-receiver A, provided with the conical bottom B and neck C, having the inner stopper-seat, $d$, of the stopper D, provided with the projections $b$, and the floating stopper F, substantially as herein shown and described.

2. The combination, with the milk-receiver A, having the conical bottom B, neck C, and stopper D, of the floating stopper F, having a specific gravity greater than that of new milk and less than that of milk from which the cream has been removed, substantially as shown and described.

MERRITT C. BARDEN.

Witnesses:
 JOHN CONNORS,
 AMOS C. POTTER.